Aug. 23, 1927.
J. E. STUNTZ
1,640,059
SUGAR MILL MACHINERY
Filed Oct. 2, 1925
4 Sheets-Sheet 1
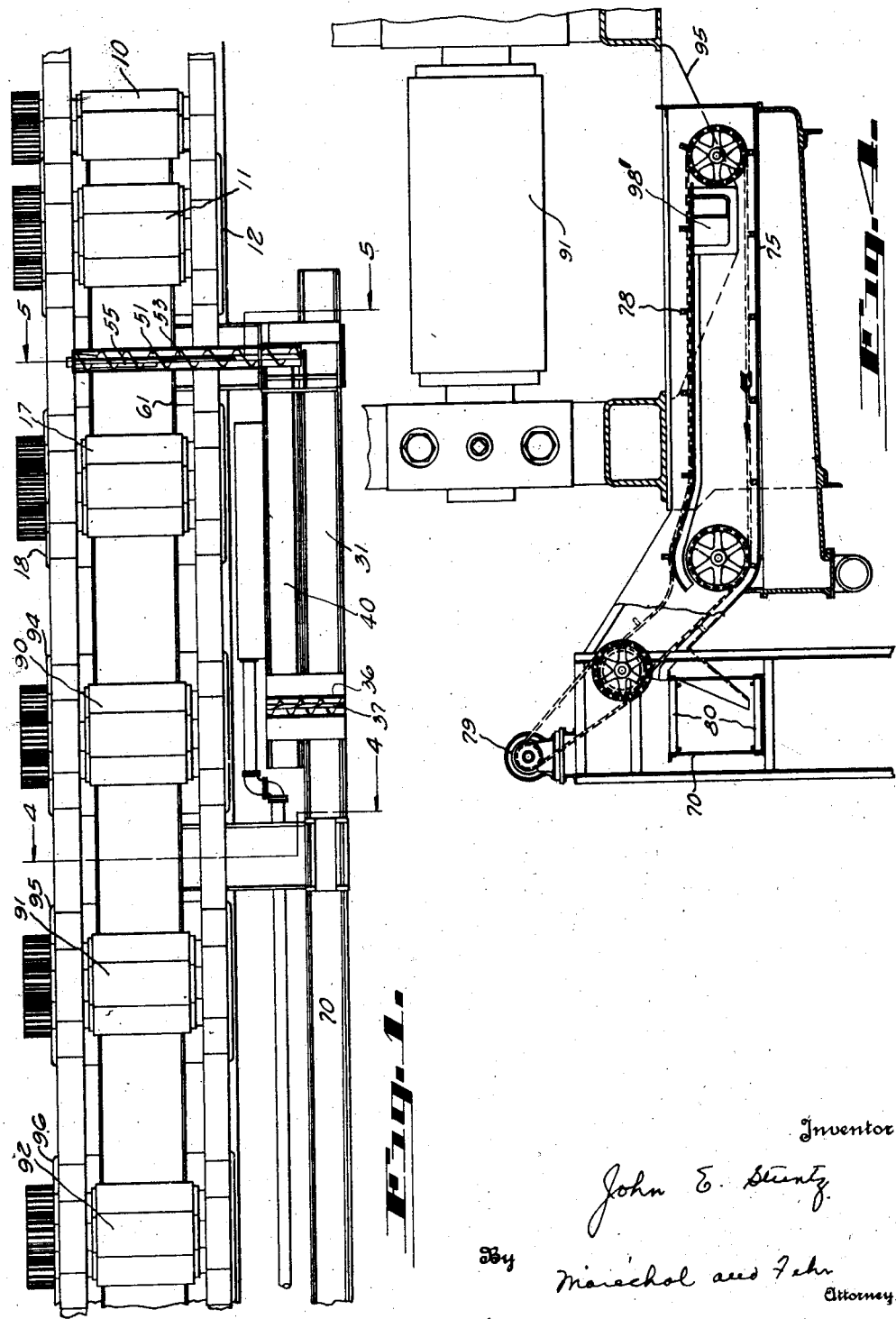
Inventor
John E. Stuntz
By Marechal and Fehr
Attorneys Aug. 23, 1927.  1,640,059
J. E. STUNTZ
SUGAR MILL MACHINERY
Filed Oct. 2, 1925   4 Sheets-Sheet 2
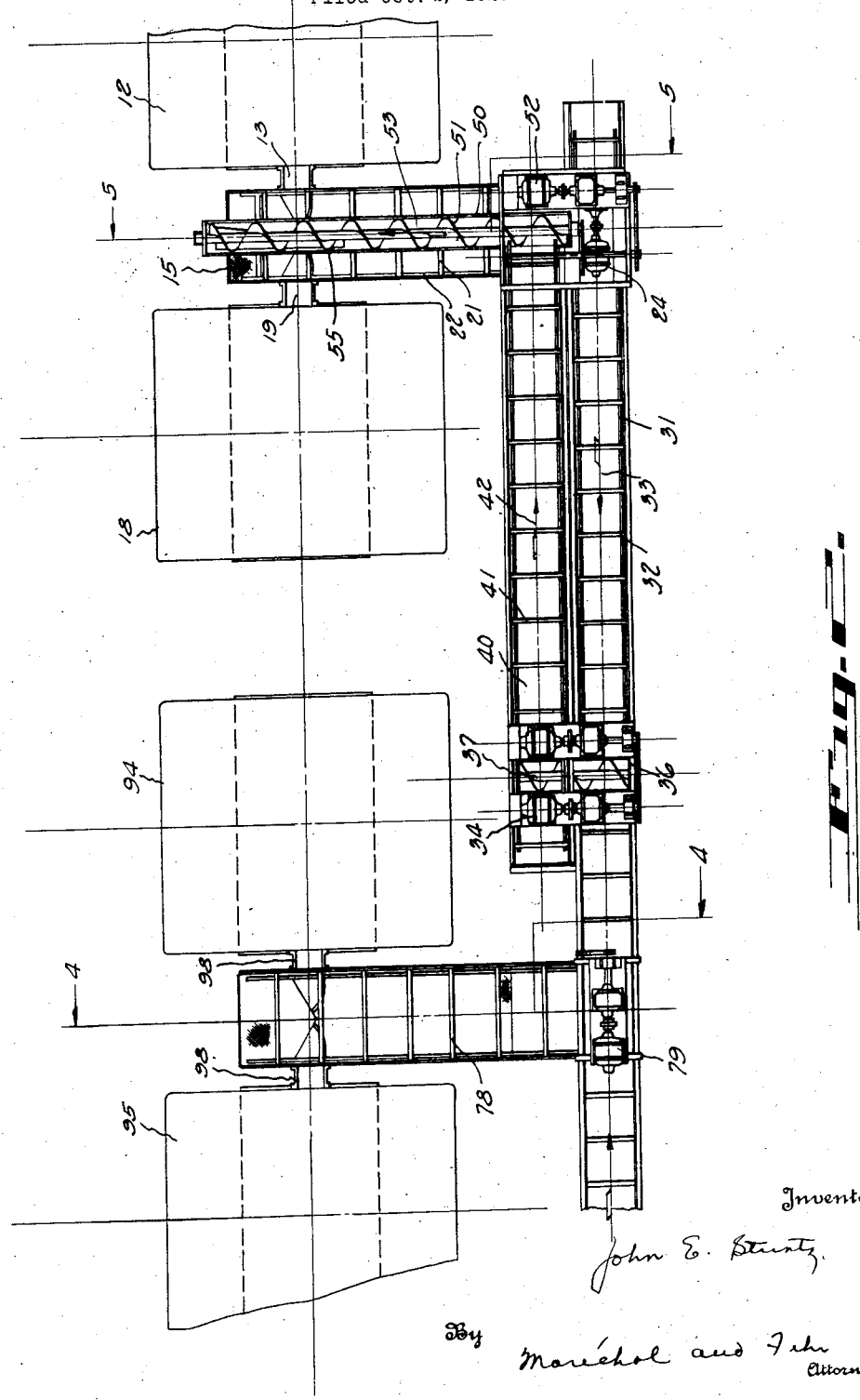
Inventor
John E. Stuntz
By Maréchal and Ihr
Attorneys Aug. 23, 1927. 1,640,059
J. E. STUNTZ
SUGAR MILL MACHINERY
Filed Oct. 2, 1925 4 Sheets-Sheet 3
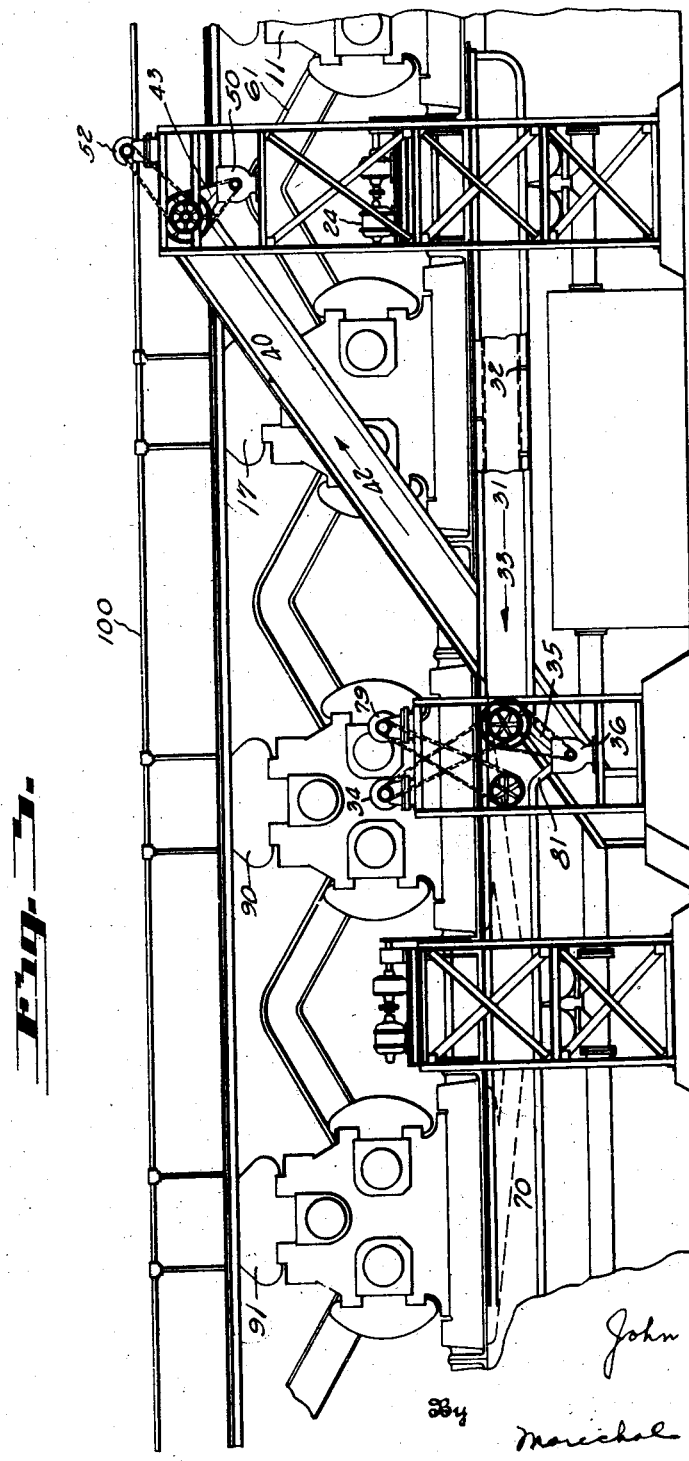
Inventor
John E. Stuntz
By Marechal and Jehr
Attorneys

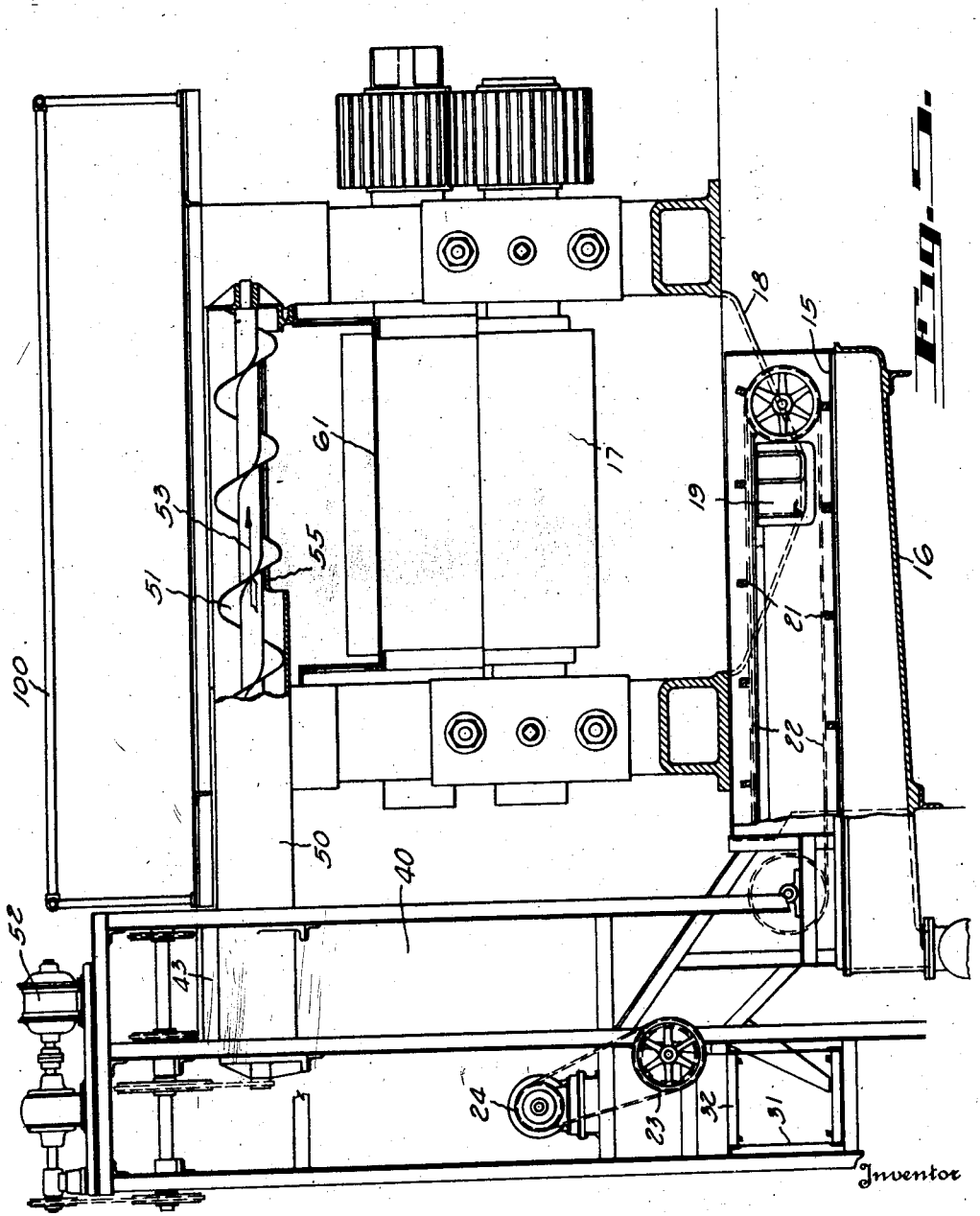

Patented Aug. 23, 1927.

1,640,059

UNITED STATES PATENT OFFICE.

JOHN E. STUNTZ, OF CENTRAL ESTRELLA, CUBA, ASSIGNOR TO THE HOOVEN, OWENS, RENTSCHLER COMPANY, OF HAMILTON, OHIO, A CORPORATION OF OHIO.

SUGAR-MILL MACHINERY.

Application filed October 2, 1925. Serial No. 60,137.

This invention relates to the manufacture of sugar, and has to do particularly with the straining of the juice which is expressed from sugar cane and subsequently treated to remove the sugar therefrom.

One of the principal objects of the invention is to provide an improved form of strainer mechanism for use with juice expressing apparatus, which is simple in construction and effective in operation.

Another object of the invention is to provide apparatus of this character which will give clearer juice, and drier trash or screenings than may be secured through the use of apparatus of the character heretofore known.

Other objects and advantages of the invention will be apparent from the description thereof set out below when taken in connection with the accompanying drawing.

In the drawing in which like characters of reference designate like parts throughout the several views thereof, Fig. 1 is a plan view of a sugar mill embodying the form of juice straining mechanism constructed in accordance with this invention;

Fig. 2 is an enlarged, fragmentary, plan view of the apparatus shown in Fig. 1, with parts broken away to more clearly disclose the invention;

Fig. 3 is a fragmentary side elevation;

Fig. 4 is a vertical sectional view along the line 4—4 of Figs. 1 and 2; and

Fig. 5 is a vertical sectional view along the line 5—5 of Figs. 1 and 2.

As is well known the greater part of the world's supply of sugar is extracted from sugar cane. In the extraction of the juice in such manufacture of sugar the cane is passed through a succession of sets of heavy crushing or expressing rolls, under high pressure, which squeezes the juice out of the stalks of cane. The resulting squeezed cane, which is called bagasse, is passed successively through succeeding sets or stands of rolls, the expressed juice, with entrained bagasse and the like, running down from the rolls and being collected for subsequent treatment. Ordinarily the cane is passed first through one or more sets of toothed or grooved rolls called "crushers" which serve to break up the fibres of the cane so as to open the juice containing cells, at the same time squeezing considerable of the juice from the cane. The crushed cane is then passed through what are known as "mill rolls" which are either smooth surfaced, or provided with circumferential or other grooves, where the remaining juice is expressed from it. Naturally some of the crushed cane, dirt or the like which may be on the cane, and other extraneous materials travel, in greater or less quantity, with the juice and must be removed before the juice can be refined to form sugar.

The first step in the treatment of the juice after it is expressed, therefore, is to strain it so as to remove the greater part of those solid impurities which may be present,—such as cane fibre, and the like. It has been the practice heretofore to provide sugar mills, of the kind generally described above, with collecting troughs associated with the several juice extracting rolls for receiving the juice, and its impurities, from these rolls and to feed the juice onto a strainer which runs alongside the length of the entire mill. Underneath this screen or strainer is a trough which collects the strained juice and from which it is drawn off for further treatment. Traveling over the top of this strainer or screen is some conveyor or other means which causes the screenings to travel along the screen surface. In this conventional construction all of the juice from all of the rolls is delivered onto the same strainer, but at different points thereof, and all the screenings are caused to travel along the surface of this strainer in the same direction being thus subjected to recurrent soaking with juice while doing so.

In the form of apparatus shown in the accompanying drawing the defects inherent in the forms of straining apparatus heretofore used are avoided. As shown in the drawing the numeral 10 designates the "crusher", or the first set of toothed rolls which act to break up the cane and open the cells and the numeral 11 the first set of mill rolls,—i. e. the "first mill". Juice from this crusher and from the first mill flows into a juice collecting pan 12, common to the crusher and first mill, to which is connected a delivery spout or passage 13, through which the juice flows onto a strainer or screen 15, arranged over a juice receiving trough 16. This strainer or screen 15 may be of any conventional construction, as the particular character of the material forming the screen, the size of the openings in the screen, etc., need not vary from the heretofore conventional practice. And the trough beneath the screen for receiving the juice may be of any desired character. Very satisfactory operation has been secured where these troughs are made of castings or of sheet metal, and supported in any suitable way upon the mill foundation, or from the mill structure. This trough is arranged substantially parallel to the rolls with which it is associated,—that is parallel to the axis of rotation of the rolls of the first mill,—and between the first mill and the second mill 17. This second mill also has a juice collecting pan 18 and a delivery spout 19 through which the juice flowing into this collecting pan flows onto the screen 15.

Cooperating with the strainer 15 is a flight conveyor, which may be of any suitable conventional character and is shown as comprising a series of wooden slats 21, mounted within spaced endless chains 22, or the like, driven by a pulley or sprocket wheel 23. Any suitable means may be provided for driving the pulley 23 to cause operation of the flight conveyor. As illustrative of a suitable means for accomplishing this there is illustrated the motor 24. The screen 15 is so arranged that the screened material dragged therefrom by the flight conveyor will be delivered into the conveyor trough 31. Within this trough there is also, preferably, a flight conveyor 32, of substantially the same construction as described above, which is caused to travel in the direction of the arrow 33, by means of a suitable motor, or the like, 34. The material deposited within the trough 31 from the screen 15 will thus be caused to travel along the trough to one end thereof which is provided with a delivery chute 35 through which this material will be deposited in one end of the trough 36 within which is a screw or scroll conveyor 37 driven in any suitable manner; preferably by the motor 34. The opposite end of the trough 36 delivers into an upwardly inclined conveyor trough 40, with which is arranged a flight conveyor 41 which moves the screened material delivered into the trough 40 in the direction of the arrow 42,—that is, back toward the screen 15. The upper end of this trough 40 is provided with a chute 43 which overlies the trough 50 within which is mounted the spiral or scroll conveyor 51. This trough 50 is horizontally arranged, at right angles to the conveyor trough 40 and extends between the first and second mills above the bagasse stream. The spiral conveyor 51 is operated in suitable manner as from the motor 52 to move any screened material delivered into the trough 50 in the direction of the arrow 53. In the bottom of the trough 50 is an opening 55 through which the screened material passing through the trough drops onto the bagasse stream within the carrier or conveyor 61 which connects the outlet side of the first mill 11 to the inlet side of the second mill 17.

This first mill, as shown, is of conventional character, a mill of this character ordinarily comprising three rolls, triangularly arranged with two rolls at the bottom and one roll on top. The cane after it has been broken up by the crusher is passed through a suitable carrier or conveyor to the first mill. It is thereafter passed successively through the "second mill", the "third mill" and any desired number of additional mills, some installations having as high as six or seven stands of mills. In the drawing, for purposes of simplicity in disclosure, only five mills are shown but any desired number may be used, and the use of additional mills is indicated by breaking away the drawing. It will be noted that the screen 15 between the first mill and the second mill receives and strains the juice expresed by the crusher and the two mills. The screen 15 and trough beneath it are divided longitudinally, the juice from the crusher and first mill being delivered on one half of the screen and that from the second mill on the other half. Thus the juices are kept separated as desired. The third and fourth mills are also provided with a screen covered trough indicated generally by the numeral 75 arranged in substantially the same manner as the screen covered trough 15. Juice expressed by these two mills flows through the outlets 98 and 98', respectively, onto the screen, the screened material being moved along the screen 75 by means of a flight conveyor 78 constructed as described above and correspondingly driven in suitable manner by the motor 79. The screenings from this strainer are moved by the conveyor into the conveyor trough 70 whence they are carried by the conveyor 80, operated as described above, and deposited through a chute 81 in the trough 36 where, with the material deposited therein from the trough 31 it is moved by the spiral conveyor 37 and deposited in the upwardly inclined trough 40. As stated above, the conveyor trough 70 is broken off, but obviously it may be continued so as to connect with a third juice strainer positioned between the fifth and sixth mills, and if desired a fourth juice strainer positioned to receive juice from additional mills, and so on. But regardless of the number of mills which may be used it is preferable to convey all the screened material into the trough 36 so that it may be carried upwardly and into the trough 50 and then deposited through the opening 55 onto the bagasse stream moving from the first to the second mill so that these screenings together with the main portion of bagasse may be moved successively through the several mills.

For purposes of certainty the third, fourth and fifth mills are respectively designated by the numerals 90, 91, and 92 while the juice collecting pans associated with those mills are designated as 94, 95, and 96 respectively. The numerals 98 and 98' designate respectively the outlet passages for the juice pans associated with the third and fourth mills. The numeral 100 designates, generally, a platform and hand-railing.

The apparatus thus described is very much superior to the conventional juice strainers as heretofore used. In the conventional type of strainer, which comprises one big strainer arranged parallel to the length of the mill or alongside the several sets of rolls, there is a separate juice delivery pipe, or inlet, to the one big strainer from each mill. The material delivered onto this strainer at the crusher end is dragged over the surface of the screen, the juice being drawn off as this is done. As this screened material moves along the screen it passes successively under the spout or juice delivery pipe leading from each succeeding juice collecting pan and is resaturated with juice by the fresh juice and material delivered onto the screen at that point. The material on the screen is therefore soaked afresh with juice at each such point. But with the form of device described, where the screens are placed parallel to the axis of rotation of the mill rolls or transverse to the path of travel of the bagasse the juice is strained from the trash independently by each strainer and this dried trash is delivered into the conveyor troughs 31 and 70. Consequently this screened trash does not again come in contact with the juice. This will, therefore, give clearer juice and drier trash. Furthermore, because of the arrangement shown, the size of each strainer unit may be independently adjusted to suit the volume of material delivered to it by the mills which it serves, and each conveyor may be independently adjusted to accord with the quantity of screenings which it must handle. Or, any juice strainer, or conveyor, may be cut out of operation without affecting the operation of any other. Also the screening surface being shorter is more easily kept clean, more readily replaced, and less likely to wear rapidly. This arrangement also permits of readily keeping the juices from the various mills entirely separated from one another.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for extracting juice from sugar cane and the like, comprising a plurality of sets of rolls, a plurality of juice strainers associated with said several sets of rolls, each juice strainer arranged independently of the others to strain the juice fed thereto from its associated rolls, and means for collecting the screenings from the several strainers and returning such screenings to pass again through the rolls.

2. Apparatus for extracting juice from sugar cane and the like, comprising a plurality of sets of rolls, a juice collecting pan associated with each set of rolls for receiving the juice and entrained bagasse and the like from the associated set of rolls, a juice strainer positioned between adjacent pairs of rolls and associated collecting pans and arranged parallel to the rolls, and means for feeding the juice from such pair of adjacent juice collecting pans to the strainer positioned therebetween.

3. Apparatus for extracting juice from sugar cane and the like, comprising a plurality of sets of rolls, a juice collecting pan associated with each set of rolls for receiving the juice and entrained bagasse and the like from the associated set of rolls, a juice strainer positioned between adjacent pairs of rolls and associated collecting pans and arranged parallel to the rolls, and means for feeding the juice from such pair of adjacent juice collecting pans to the strainer positioned therebetween, and means associated with said strainer for removing the screenings therefrom.

4. Apparatus for extracting juice from sugar cane and the like, comprising a plurality of sets of rolls, a juice collecting pan associated with each set of rolls for receiving the juice and entrained bagasse and the like from the associated set of rolls, a juice strainer positioned between adjacent pairs of rolls and associated collecting pans and arranged parallel to the rolls, and means for feeding the juice from such pair of adjacent juice collecting pans to the strainer positioned therebetween, and means associated with said strainer for removing the screenings therefrom, and conveyor means for receiving the removed screenings.

5. Apparatus for extracting juice from sugar cane and the like, comprising a plurality of sets of rolls, a juice collecting pan associated with each set of rolls for receiving the juice and entrained bagasse and the like from the associated set of rolls, a juice strainer positioned between adjacent pairs of rolls and associated collecting pans and arranged parallel to the rolls, and means for feeding the juice from such pair of adjacent juice collecting pans to the strainer positioned therebetween, and means associated with said strainer for removing the screening therefrom, and conveyor means for receiving the removed screenings and returning said screenings to the bagasse to pass again through the rolls.

6. Apparatus for extracting juice from sugar cane and the like, comprising a plurality of sets of rolls, a juice collecting pan associated with each set of rolls and having an outlet therefrom, the pans being arranged in pairs with the outlets on adjacent sides of the pans of each pair, a juice strainer arranged between said adjacent sides of each pair of pans to receive juice from the outlets, said strainer comprising a juice receiving trough, a screen thereover onto which the juice from the outlets flows, means for moving the screenings off of said screen, and a conveyor arranged alongside the apparatus and at the ends of the screens of the several juice strainers to receive the screenings moved off the screens.

7. Apparatus for extracting juice from sugar cane and the like, comprising a plurality of sets of rolls, a juice collecting pan associated with each set of rolls and having an outlet therefrom, the pans being arranged in pairs with the outlets on adjacent sides of the pans of each pair, a juice strainer arranged between said adjacent sides of each pair of pans to receive juice from the outlets, said strainer comprising a juice receiving trough, a screen thereover onto which the juice from the outlets flows, means for moving the screenings off of said screen, and a conveyor arranged alongside the apparatus and at the ends of the screens of the several juice strainers to receive the screenings moved off the screenings and for returning the screenings to the bagasse to be again passed through the sets of rolls.

8. Apparatus for extracting juice from sugar cane and the like, comprising a plurality of sets of rolls, a juice strainer arranged between each two adjacent sets of rolls and parallel thereto, and a conveyor arranged alongside the ends of the several sets of rolls to receive the screenings from the juice strainer.

9. Apparatus for extracting juice from sugar cane and the like, comprising a plurality of sets of rolls, juice strainers arranged parallel to the sets of rolls and between adjacent sets of rolls, a conveyor associated with each juice strainer to receive said screenings therefrom and to move the said screenings toward a common point, and an independent conveyor for receiving the screenings moved to said point to return such screenings to the bagasse passing through the apparatus.

10. Apparatus for extracting juice from sugar cane and the like, comprising a plurality of sets of rolls, juice strainers arranged parallel to the sets of rolls and between adjacent sets of rolls, a conveyor associated with each juice strainer to receive said screenings therefrom and to move the said screenings toward a common point, and an independent conveyor for receiving the screenings moved to said point to return such screenings to the bagasse passing through the apparatus, comprising an elevated portion overlying the bagasse stream and having a delivery opening therein, and an inclined portion leading thereto.

11. Apparatus for extracting juice from sugar cane and the like comprising a crusher and first mill having a common juice collecting pan, a second mill having a juice collecting pan, the common collecting pan and second mill pan each having an outlet opening on adjacent sides thereof, a juice strainer positioned between the said first and second mills and to receive juice from said collecting pans through the outlet openings, means for moving the screenings from said juice strainer to a conveyor; additional mills each having a collecting pan, said additional mills being arranged in associated pairs having a juice strainer positioned between the mills of each such pair and to receive juice from the adjacent sides of said pans, means for moving screenings from said juice strainers to a second conveyor, said second conveyor receiving the screenings from the said additional pairs of mills, each of the said conveyors moving the screenings received thereon to empty into a third conveyor arranged to return the screenings to the stream of bagasse passing through the mill.

12. In apparatus for extracting juice from sugar cane and the like, comprising a plurality of sets of crushing rolls, independent juice collecting pans associated with each of the said sets of rolls to receive the juice separated from the bagasse, and juice straining apparatus associated with each set of rolls and its juice-collecting pan comprising a strainer arranged parallel to the said set of rolls with which it is associated, to independently strain the juice received from its associated rolls and juice-collecting pan.

13. In apparatus for extracting juice from sugar cane and the like, which comprises a pluraltiy of sets of juice extracting rolls, and a juice collecting pan associated with each set of rolls, a juice strainer positioned between each adjacent pair of sets of rolls to receive from the collecting pans of the said adjacent pair of rolls the juice to be strained, whereby the juice from each said pair of rolls is independently strained, means for removing the screenings from each of said strainers, and means for returning the said removed screenings to the bagasse to again pass through the rolls.

14. Apparatus for extracting juice from sugar cane and the like, comprising a plurality of sets of rolls, a plurality of juice strainers, each juice strainer being associated with a set of rolls and arranged to independently strain the juice fed to such strainer from its associated rolls after its separation from the bagasse, conveyor means associated with each juice strainer for removing the screenings therefrom, and independent means for operating each of the said conveyor means.

15. Apparatus for extracting juice from sugar cane and the like, comprising a plurality of sets of rolls, a plurality of juice strainers, each juice strainer being associated with a set of rolls and arranged to independently strain the juice fed to such strainer from its associated rolls after its separation from the bagasse, means associated with each juice strainer for removing the screenings therefrom, conveyor means associated with certain of the said juice strainers to receive the screenings removed therefrom, and a second conveyor means associated with others of the said juice strainers to receive the screenings from said other juice strainers, and independent means for operating the said conveyors.

16. In apparatus for extracting juice from sugar cane and the like, which comprises a plurality of sets of rolls for crushing the cane to express the juice therefrom and juice collecting pans associated with the several sets of rolls, a plurality of juice strainers associated with certain of the sets of rolls and arranged parallel thereto each adapted to strain the juice fed thereto after its separation from the bagasse independently of the other strainers, means associated with each of the strainers for removing the screenings therefrom, conveyor means associated with certain of the said strainers to receive the screenings removed from the said strainers, other conveyor means associated with other of the said strainers to receive the screenings removed from said other strainers, and independent means for operating the screenings removing means and associated conveyor means whereby the said removing means and conveyor means may be operated independently of each other.

17. Apparatus of the character described comprising crushing rolls, a screen arranged parallel with the said rolls, and collecting means associated with said rolls and said screen having means for feeding onto the screen the material collected from the rolls after its separation from the bagasse.

18. Apparatus of the character described for extracting juice from sugar cane and the like, comprising a set of crushing rolls, a collecting pan for receiving from the rolls the juice and entrained bagasse and the like after its separation from the bagasse, and a juice strainer associated with the collecting pan and arranged parallel to the rolls.

19. Apparatus for extracting juice from sugar cane and the like, comprising a set of crushing rolls, a collecting pan for receiving from the rolls the juice and entrained bagasse and the like, said pan having an outlet therefrom, a juice strainer arranged parallel to the rolls and to receive from the said outlet the juice to be strained, said strainer comprising a juice receiving trough, a screen thereover, and means for removing the screenings from said screen.

20. Apparatus for extracting juice from sugar cane and the like, comprising a set of crushing rolls, a collecting pan for receiving from the rolls the juice and entrained bagasse and the like, said pan having an outlet therefrom, a juice strainer arranged parallel to the rolls and to receive from the said outlet the juice to be strained, said strainer comprising a juice receiving trough, a screen thereover, and means for removing the screenings from said screen and a conveyor for receiving the removed screenings.

21. Apparatus for extracting juice from sugar cane and the like, comprising a set of crushing rolls, a collecting pan for receiving from the rolls the juice and entrained bagasse and the like, said pan having an outlet therefrom, a juice strainer arranged parallel to the rolls and to receive from the said outlet the juice to be strained, said strainer comprising a juice receiving trough, a screen thereover, and means for removing the screenings from said screen and a conveyor for receiving the removed screenings and returning such screenings to the bagasse passing through the rolls.

22. Apparatus for extracting juice from sugar cane and the like, comprising a plurality of sets of rolls, a plurality of independent juice strainers arranged alongside said rolls, means for feeding to said juice strainers the juice after its separation from the bagasse from certain of said sets of rolls, to independently strain the juice from the said several sets of rolls.

In testimony whereof I hereunto affix my signature.

JOHN E. STUNTZ.